United States Patent
Cook et al.

(10) Patent No.: US 6,692,051 B1
(45) Date of Patent: Feb. 17, 2004

(54) TRACTOR-TRUCK CAB WITH WORKSTATION AND MOBILE SEAT

(75) Inventors: Charles L. Cook, Valley View, TX (US); Jeffrey S. Corey, Krum, TX (US); William C. Kahn, Denton, TX (US); Frank H. Schneck, Jr., Corinth, TX (US)

(73) Assignee: Paccar Inc, Bellevue, WA (US)

( * ) Notice: Subject to any disclaimer, the term of this patent is extended or adjusted under 35 U.S.C. 154(b) by 0 days.

(21) Appl. No.: 10/213,850

(22) Filed: Aug. 7, 2002

(51) Int. Cl.$^7$ ................................................ B60N 3/00
(52) U.S. Cl. ............................... 296/24.1; 296/190.01; 296/65.11
(58) Field of Search ........................... 296/24.1, 65.11, 296/190.01; 180/287

(56) References Cited

U.S. PATENT DOCUMENTS

| | | | |
|---|---|---|---|
| 2,670,987 A | 3/1954 | Walsh | 296/65 |
| 2,753,947 A | 7/1956 | Mach | 180/89 |
| 2,758,872 A | 8/1956 | Solomon et al. | 296/65 |
| 2,820,687 A | 1/1958 | Waring | 312/350 |
| 2,858,877 A | 11/1958 | Krause | 155/14 |
| 3,692,270 A * | 9/1972 | McAuliffe | 248/384 |
| 4,505,510 A | 3/1985 | Lepoix | 296/70 |
| 4,619,386 A | 10/1986 | Richardson | 224/277 |
| 4,811,240 A | 3/1989 | Ballou et al. | 364/518 |
| 5,106,141 A | 4/1992 | Mostashari | 296/24.1 |
| 5,137,321 A | 8/1992 | Landry et al. | 296/24.1 |
| 5,197,774 A | 3/1993 | Diaz | 296/24.1 |
| 5,207,471 A | 5/1993 | Mutschler et al. | 296/37.12 |
| 5,279,488 A | 1/1994 | Fleming | 248/279 |
| 5,492,068 A | 2/1996 | McKee | 108/44 |
| 5,567,004 A | 10/1996 | Pietzsch | 296/190 |
| 5,636,884 A | 6/1997 | Ladetto et al. | 296/65.1 |
| 5,765,894 A | 6/1998 | Okazaki et al. | 296/65.1 |
| 5,820,194 A | 10/1998 | Slayter | 296/70 |
| 5,823,599 A | 10/1998 | Gray | 296/37.8 |
| 5,915,776 A | 6/1999 | Bieri | 296/37.12 |
| 5,973,917 A | 10/1999 | White | 361/683 |
| 6,021,720 A | 2/2000 | Boos et al. | 108/44 |
| 6,039,141 A * | 3/2000 | Denny | 180/329 |
| 6,086,129 A | 7/2000 | Gray | 296/37.8 |
| 6,109,493 A | 8/2000 | Bieri | 224/483 |
| 6,113,047 A | 9/2000 | Wung et al. | 248/284.1 |
| 6,158,795 A | 12/2000 | Gray et al. | 296/37.8 |
| 6,244,649 B1 | 6/2001 | Scheck et al. | 296/65.03 |

OTHER PUBLICATIONS

"Business Week", Nov. 29, 1999, p. 109, "Keep on Truckin".*
Internet, evsltd.com, *Safe\* Line Emergency Vehicle Seats*, Jun. 26, 2001 (2 pages).

\* cited by examiner

*Primary Examiner*—Dennis H. Pedder
(74) *Attorney, Agent, or Firm*—Sidley Austin Brown & Wood LLP

(57) ABSTRACT

Provided herein is a cab for a tractor-truck. The cab includes a work station, suitable for use as a desk or the like, which can be provided with common office machines. Also provided in the cab is a seat, which is slidably fixed to a seat-supporting track that extends across the floor of the cab, so that the seat can be selectively positioned between a driving position and a workstation position. The tractor-truck can be equipped with an interlock system that keeps the vehicle from moving if the seat is not in the driving position. Also, when the seat is not in the workstation position, a second seat can be detachably fixed in the workstation position.

36 Claims, 6 Drawing Sheets

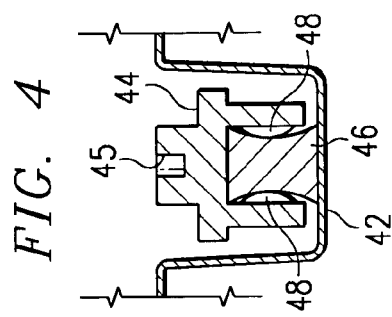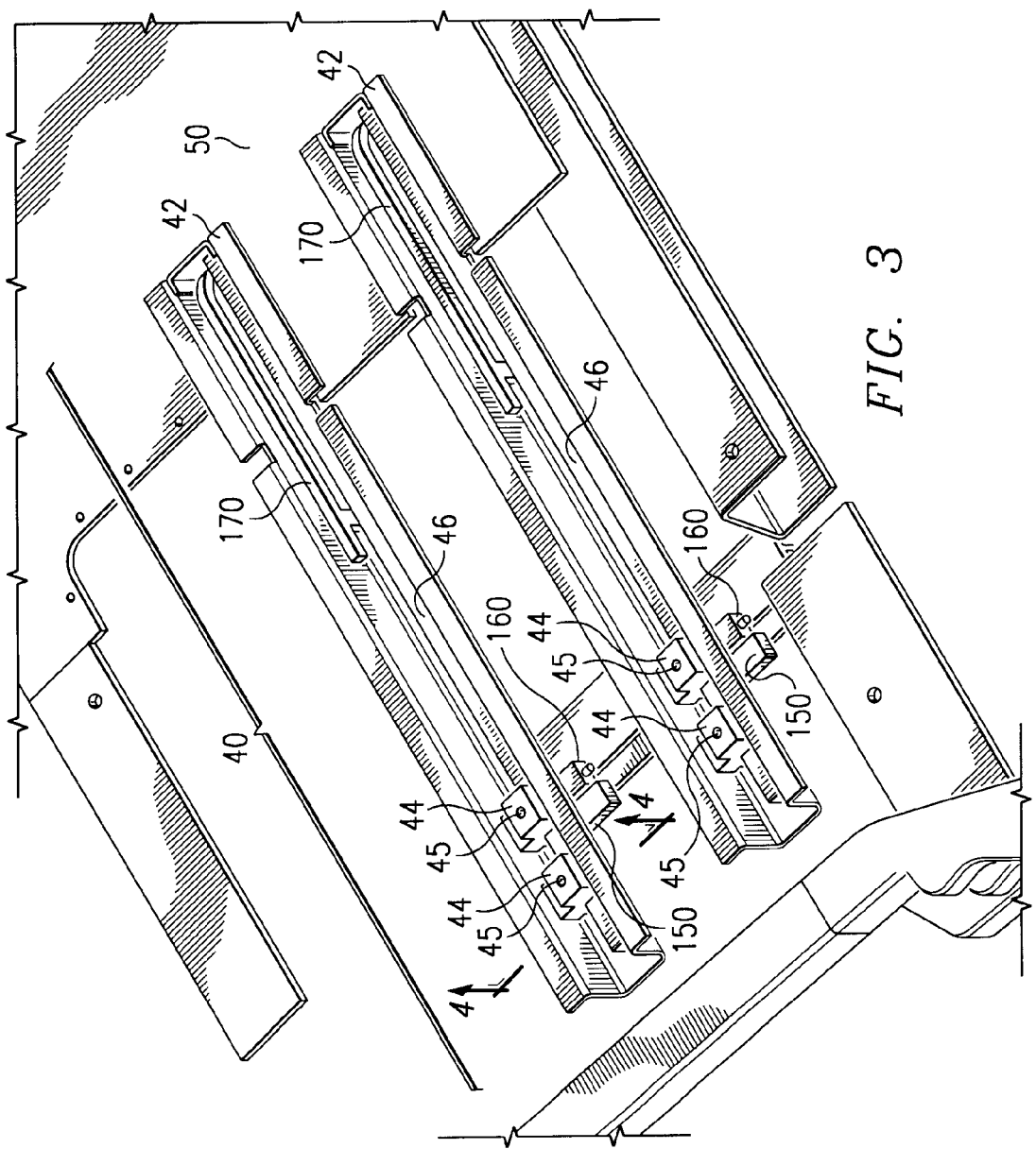

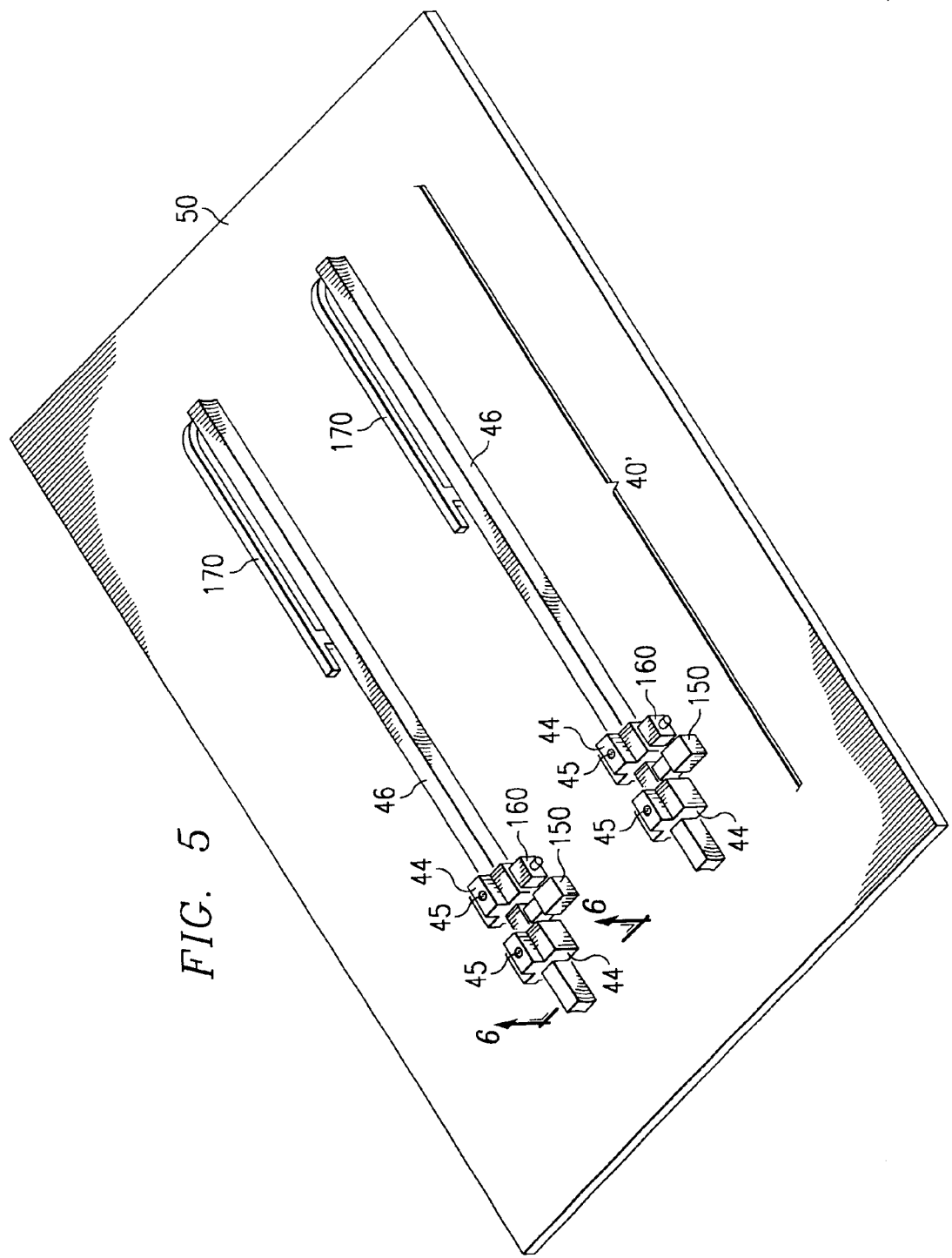

TRACTOR-TRUCK CAB WITH WORKSTATION AND MOBILE SEAT

FIELD OF THE INVENTION

This invention relates to cab units for use with tractor-trailer rigs and the like.

BACKGROUND OF THE INVENTION

Tractor-trailer rigs used for long-distance hauling of goods have become commonplace on the road today. Almost all of the tractor-truck cabs of these rigs are tailored to accommodate two or more occupants, including a driver and at least one passenger, seated side-by-side in a front portion of the cab. However, many drivers are solo-operators who primarily travel alone. As a result, the passenger seating often remains substantially unused.

As a result of the long hours required and the mobile nature of truck driving, a truck driver often uses the tractor-truck cab for multiple tasks. For instance, many drivers utilize their tractor-truck cab for sleeping quarters and for performing job functions other than driving. More elaborate tractor-truck cabs, such as sleeping cabs, have been provided with various built-in accessory structures rearward of the front portion of the cab (i.e., behind the front driver and passenger seats) such as a sleeping bunk or a shelf for supporting a mattress, cabinets for storing articles and clothes, and receptacles for appliances, such as refrigerators and cooling devices. Despite these many amenities, a tractor-truck cab is often a difficult location to efficiently perform functions other than driving, including but not limited to administrative tasks like electronic and wireless communications, computer work, and document filing and storage. The difficulties associated with performing such functions in existing tractor-truck cabs include the limited space available, the limited seating and ergonomic arrangements, the limited amenities for connecting and/or mounting the necessary equipment, and the security concerns with locating such equipment in the tractor-truck cab.

In the past, mobile office provisions have been available in other types of vehicles such as vans where space rearward of the front driver and passenger seats is more plentiful. For instance, U.S. Pat. No. 5,137,321 to Landry et al. shows a van conversion for converting the cargo space rearward of the front driver and passenger seats of a cargo van into a mobile office. The mobile office includes an L-shaped desk with mounts for a computer and a fax machine, filing cabinets that can be accessed through the rear doors of the cargo van, and a pivoting desk seat all mounted in the open floor area rearward of front driver and passenger seats. However, tractor-truck cabs do not usually include the rear doors available with most cargo vans, so the rear filing cabinets would be inaccessible. In addition, the mobile office conversion disclosed by Landry et al. has the disadvantage of not including any provisions for a sleeping area, which is desirable in a tractor-truck cab.

U.S. Pat. No. 5,106,141 to Mostashari also shows a van-type vehicle that has been converted into a mobile office complete with a collapsible desk and a desk chair provided rearward of the front driver and passenger seats. This mobile office also includes a roll-up bed mounted along the top rear corner of the vehicle. In order to extend the roll-up bed, the desk must be collapsed and rotated out of the way and the desk chair must be rotated a certain way in order to allow space for the extending the roll-up bed. This has the disadvantages of making the desk and desk chair inaccessible while the bed is extended, requiring a reconfiguration of the vehicle space each time it is desired to alternately take advantage of the sleeping-related features or the office-related features, and not allowing for the sleeping-related features and office-related features to be accessible simultaneously. In addition, a tractor-trailer truck cab may not be long enough for a roll-up bed to extend back-to-front as can be done in the space available in a van type vehicle.

Thus, a need exists for a tractor-truck cab in which administrative functions can be conveniently and comfortably performed in the limited space available without eliminating other desirable features, such as sleeping quarters and the like, and without requiring reconfiguring the cab area each time it is converted from an office configuration to a sleeping configuration and back.

SUMMARY OF THE INVENTION

In view of these and other shortcomings, it is an object of this invention to provide an improved tractor-truck cab for a tractor-trailer rig.

It is another object of this invention to provide a tractor-truck cab wherein a workspace is provided. In one aspect of the invention, the workspace has been provided in the front passenger area of a tractor-truck cab, thereby utilizing a portion of the space in the tractor-truck cab that otherwise often remains substantially unused. In this way, an office space can be provided in a tractor-truck cab without affecting cab features, such as sleeping quarters, that are provided rearward of the front portion of the tractor-truck cab. Thus, in accordance with at least one aspect of the present invention, a workspace and sleeping quarters can coexist in a tractor-truck cab without the need for reconfiguring the cab area to convert from an office configuration to a sleeping configuration as required in prior mobile offices as discussed above.

It is a further object of this invention to provide a tractor-truck cab wherein a single seat can be positioned at either one of a driving position and a workspace position.

These and other objects of the invention are accomplished by providing a tractor-truck cab comprising a driving position, at which the tractor-truck can be operated, and a workstation position, at which tasks can be performed, wherein the workstation position has a work-surface platform associated therewith. A seat-supporting track is provided which extends between the driving position and the workstation position. A seat is mounted on the seat-supporting track for movement therealong between the driving position and the workstation position. Thus, the space typically reserved for often-unnecessary passenger seating is utilized to provide a workstation, allowing for comfortable and efficient performance of administrative tasks.

In one embodiment of the present invention, the work-surface platform has one edge extending along a portion of a forward wall of the cab, and another edge extending along a portion of a passenger-side wall of the cab. In order to allow for increased visibility for a driver while operating the tractor-truck cab, the work-surface platform is preferably provided below the windows of the cab.

A further embodiment of the present invention can also be provided with office equipment, including a computer, monitor, printer, scanner, fax machine, telephone and the like. Preferably, a computer keyboard can be fixed to an upper edge of the work-surface platform. Also, it is preferable to provide a computer monitor below the work-surface platform to allow for increased visibility for a driver while operating the tractor-truck cab. A window can also be provided in the work-surface platform to allow for viewing of the computer monitor when it is located below the work-surface platform.

A still further embodiment of the present invention can also include a filing cabinet, preferably located below the work-surface platform to allow for convenient access from the workstation position.

Yet another embodiment of the present invention can include a privacy curtain slidably fixed to a curtain track, such that the curtain can be extended therealong for covering some or all of the tractor-truck windows.

BRIEF DESCRIPTION OF THE DRAWINGS

The present invention is illustrated by way of example and is not limited by the figures of the accompanying drawings, in which like reference numbers indicate similar parts:

FIG. 3 shows a partially broken away perspective view of a tractor-truck cab floor in accordance with an embodiment of the present invention, showing an example of a seat-supporting track;

FIG. 4 shows an enlarged, cross-sectional view of a portion of a seat-supporting track taken along line 4—4 of FIG. 3;

FIG. 5 shows a perspective view of the tractor-truck cab floor in accordance with an embodiment of the present invention, showing a second example of a seat-supporting track;

FIG. 6 shows an enlarged, cross-sectional view of a portion of a seat-supporting track taken along line 6—6 of FIG. 5;

DETAILED DESCRIPTION OF THE INVENTION

It should be noted that, while the embodiment described below and illustrated in the several figures is done so with reference to a left hand drive vehicle, the present invention is not necessarily limited to left hand drive vehicles, but can include right hand drive vehicles as well. For instance, the embodiment described below can be reversed for use in a right hand drive vehicle.

Figure 1:
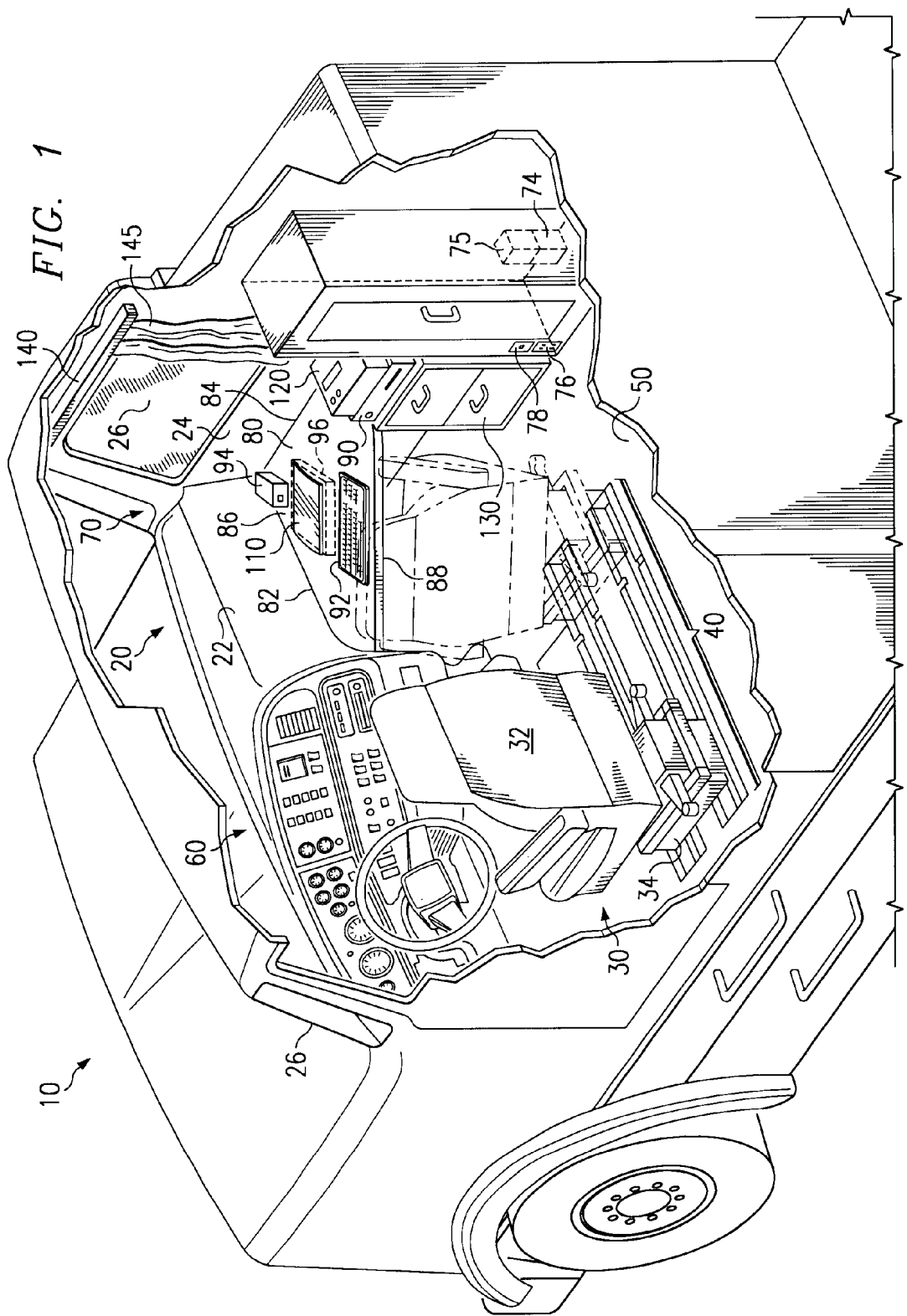
FIG. 1 shows a partially broken away perspective view of a tractor-truck cab in accordance with an embodiment of the present invention.

FIG. 1 shows a partially broken away perspective view of a tractor-truck 10 in accordance with an embodiment of the present invention. The broken away portions provide a view of the interior of the cab 20 of tractor-truck 10. Provided in the cab 20 is a seat 30, which is slidably mounted on a seat-supporting track 40 for movement therealong. The seat-supporting track 40 is fixed to the floor 50 of the cab 20, and extends across the floor 50 from a driving position 60 to a workstation position 70, preferably in a substantially lateral direction. The seat-supporting track 40 provides a continuous guide for the seat 30 from the driving position 60 to the workstation position 70 and back. Thus, in the present embodiment, an operator can move the seat 30 back and forth from the driving position 60 to the workstation position 70 along the seat-supporting track 40 as will be explained in greater detail below.

The workstation position 70 is primarily provided as a seat position from which an operator can comfortably perform administrative tasks such as electronic and wireless communications, computer work, and document filing and storage from the seat 30. When the seat 30 is in the workstation position 70, the seat 30, as show in phantom in FIG. 1, can be rotated to face a work-surface platform 80. It is preferable that the seat 30 also be capable of adjustments such as height, tilt, and lumbar support in order to provide the operator with an ergonomically correct and/or comfortable working position when the operator is working at the work-surface platform 80 from the seat 30.

The work-surface platform 80 is suitable for use as any type of office-related work surface such as a desk or a computer workstation. The work-surface platform 80 can be constructed from any substantially rigid material suitable for use as a desk or work surface such as wood, laminate, or metal. As illustrated in FIG. 1, the work-surface platform 80 of the present embodiment includes a first edge 82, which extends along a portion of the forward wall 22 of the cab 20. The work-surface platform 80 also includes a second edge 84, which extends along a portion of the right side wall 24 of the cab 20. The work-surface platform 80 is preferably positioned such that an upper surface 86 of the work-surface platform 80 is at a height which allows the work-surface platform 80 to be used as a desk by the operator when seated in the seat 30 positioned at the workstation position 70. A suitable height can be any distance from the floor that allows for the upper surface 86 of the work-surface platform 80 to be suitable for use as a desk, workstation, drafting table or the like for a person seated in the seat 30 while the seat 30 is positioned at the workstation position 70, a preferable height being in the range of 20 inches to 40 inches, and a more preferable height being in the range of 25 inches to 31 inches. Another consideration in selecting a height is that the work-surface platform 80 be comfortable for use as a desk while not obscuring a view through any windows 26 of the cab 20. This arrangement provides for convenient use of the work-surface platform 80 as a desk or the like without hindering safe operation of the tractor-truck 10.

The work-surface platform 80 of the present embodiment is installed in the cab 20 as a permanent installation. However, the present invention is not necessarily so limited. Rather, the work-surface platform 80 of the present invention can be installed in a temporary manner if so desired. In either case, the work-surface platform 80 can be secured in place using any known securing means such as gussets mounted to a wall (e.g. forward wall 22 and right side wall 24) of the cab and a lower surface 88 of the work-surface platform 80. Optionally, the work-surface platform 80 can be installed such that the height of the upper surface 86 is adjustable.

The cab 20 can be equipped with a variety of optional office machines. In the present embodiment, as shown in FIG. 1, the cab 20 is equipped with a computer 90, which is fixed to the upper surface 86 of the work-surface platform 80. The computer 90 can be any type of computer, or can be a portable-computer mounting base such as a port replicator for docking a notebook computer. A peripheral device 120 is located above the computer 90 and can be fixed to the computer 90 or a stand (not shown). The peripheral device 120 is in communication with the computer 90 using any one of, or combination of, known forms of wired and wireless communication. The peripheral device 120 can feature one or more of any of the many different capabilities available in computer peripheral devices such as printing, plotting, scanning, imaging, faxing, and photocopying.

Alternatively, the present invention can include any number of peripheral devices 120 as described above, including none at all. To that end, it should be pointed out that the location and number of office machines can be changed without departing from the scope of the present invention. The final number and location of office machines can vary depending on several different factors such as the particular components used, the specific needs of the user, and the exact configuration of the truck cab.

In the present embodiment, a wireless keyboard 92 and a wireless-keyboard receiver 94 are fixed to the upper surface 86 of the work-surface platform 80. The wireless keyboard 92 and the wireless-keyboard receiver 94 are aligned as necessary to permit communication therebetween. The wireless keyboard 92 is provided as a user input to the computer 90. The wireless-keyboard receiver 94 is in communication with the computer 90 using any one of, or combination of, known forms of wired and wireless communication. When the keyboard 92 is in use by the operator, the keyboard 92 transmits the operator's input to the wireless-keyboard receiver 94, which, in turn, relays the operator's input to the computer 90.

Alternatively, any type of keyboard, wireless or not, can be used in place of the wireless keyboard 92. Also, as mentioned above, the location of the wireless keyboard 92 and wireless-keyboard receiver 94 can be varied. For instance, a type of wireless communication can be provided between the wireless keyboard 92 and the wireless-keyboard receiver 94 that does not require line-of-sight, such as an RF-type of wireless communication, which would allow the wireless keyboard 92 and the wireless-keyboard receiver 94 to be mounted anywhere in the cab 20 without the need for aligning the wireless-keyboard receiver 94 with the wireless keyboard 92. As a result, the wireless-keyboard receiver 94 can be optionally mounted on the lower surface 88 of the work-surface platform 80, mounted out of the way in a cabinet, or even integrated into the computer 90. The keyboard 92 can be optionally mounted on a keyboard tray, such as any of the many types of keyboard trays that are widely known, and the keyboard tray can be mounted to the lower surface 88 of the work-surface platform 80.

A flat panel monitor 96 is provided for displaying, through a display window 110, output to a user from the computer 90. The display window 110 is an aperture in the work-surface platform 80 which can include a panel made of a substantially rigid and substantially transparent material such as glass or a plastic glass-substitute.

The display window 110 can optionally include optical-enhancing features such as magnification and/or filtration of images passing through the display window 110 from the monitor 96. The present invention can optionally include means for covering the display window 110 when the monitor 96 is not in use, such as a sliding panel (not shown) incorporated into the work-surface platform 80 that an operator can slide over the top of the display window 110, so as to provide an extra degree of security by concealing the monitor 96. Thus, it is preferable for the sliding panel to at least somewhat blend in with the upper surface 86 of the work-surface platform 80 by being provided with the same color, pattern, or the like as the upper surface 86 of the work-surface platform 80.

The flat panel monitor 96 is supported by a monitor support bracket (not shown), which is fixed to a lower surface 88 of the work-surface platform 80. The monitor support bracket can be constructed of a substantially rigid material, such as sheet metal, formed so as to allow for proper positioning and supporting of the flat panel monitor 96. Ideally, the flat panel monitor 96 is positioned so that it can be comfortably viewed through the display window 110 by an operator seated in the seat 30 in the workstation position 70. In this way, the flat panel monitor 96 is conveniently located for viewing by an operator in the workstation position 70 without obstructing the view of a driver in the driving position 60 through the windows 26 of the cab 20.

While the flat panel monitor 96 has been shown as a computer display in this embodiment, there are many known computer displays that can be adapted for use with the present invention. Thus, the exact form of the monitor support bracket is not critical, but can vary depending on the make and model of the computer display selected. Furthermore, the computer display does not necessarily need to be a flat panel monitor viewed through the display window 110. Any type of computer display and mounting position can be used so long as it is used and positioned in a manner that does not substantially obstruct the driver's view through the windows 26 while in the driving position 60.

For instance, the computer display can be mounted above the upper surface 86 of the work-surface platform 80 using a monitor support bracket that is adjustable between a viewing position and a driving position. Another option can be to install a monitor, such as a fold-down and swivel LCD type, in the ceiling, wall, dashboard, or other part of the cab where it can be used as the computer display, in some cases eliminating the need for the display window 110 and providing additional desk space and/or allowing for a smaller work-surface platform 80. A further option can be to provide a space on the work-surface platform 80 for a detachable or detached display that can communicate with the computer 90 by being attached to a computer video cable (not shown) and/or via wireless communication when needed for use as the computer display, and can also be detached, if necessary, and, when not needed as the computer display, can be stored elsewhere or used for another purpose, such as a television monitor and/or a navigational-system monitor.

Power is supplied to the various office machines from an inverter 74, which is controlled by an inverter controller 75. Power from the inverter 74 can also be provided to one or more auxiliary power outlets 76. The inverter 74, using known technology, is capable of converting a voltage supplied by the tractor-truck's voltage source to a voltage suitable for operating the various office machines. In some cases, the inverter 74 and inverter controller 75 can be provided together in a single unit. One or more voice/data outlets 78 can also be provided, each of which can include any combination of voice and/or data outlets such as RJ11, RJ12, RJ45, BNC, F-Type, RCA, Banana Type, Binding Post, and S-Video. The voice/data outlets 78 provide connection points suitable for use with communication devices such as telephones, fax machines, and modems. The present invention can include any number of inverters 74, inverter controllers 75, auxiliary power outlets 76, and voice/data outlets 78.

The cab 20 can also be equipped with a variety of storage compartments. In the embodiment shown in FIG. 1, a filing cabinet 130 having a plurality of file drawers is provided below the work-surface platform 80 and fixed to the floor 50 of the cab 20. In general, the structure of the filing cabinet 130 can be similar to that of any common filing cabinet furniture commonly found in office settings and can include one or more file drawers. However, it is preferable that the file drawers include a known latching mechanism (not shown) to fasten the file drawers in a closed position so that the file drawers do not freely open, especially during vehicle operation, unless the latching mechanism is intentionally unlatched. Moreover, the file drawers can include a known retaining mechanism (not shown) that holds the file drawers in an open position, especially when the vehicle is on a sloped surface, unless the retaining mechanism is intentionally overcome.

Finally, the cab 20 can be provided with a means for blocking some or all of the windows 26 of the tractor-truck 10 to reduce or eliminate the amount of light traveling into the interior of cab 20 from the exterior of tractor-truck 10. In the embodiment shown in FIG. 1, a curtain track 140 is provided along a top edge of each of the windows 26. A curtain 145, which can include one or more panels, is slidably fixed to the curtain track 140. In this manner, the curtain 145 can be extended along some or all of the curtain track 140 for selectively blocking some or all of the windows 26. An additional advantage of this feature is the increased security afforded by the ability to block others from viewing the interior of cab 20 from the exterior of tractor-truck 10.

There are many suitable alternatives to the combination of the curtain track 140 and the curtain 145 of this embodiment. For example, the curtain 145 can be removably fixed over some or all of the windows 26 using snaps, Velcro™, or some other such fastener. Other acceptable alternatives include window blinds and/or shutters.

Because the embodiment described above occupies a substantial portion of the space in cab 20 typically reserved for a passenger, the usefulness of a passenger door can be limited. Therefore, a tractor-truck in accordance with the present invention can be provided without a passenger side door, with a passenger side door that is permanently closed, or with a passenger side door located at a rearward position of cab 20 where it is not obstructed by the features of this invention.

Figure 2:
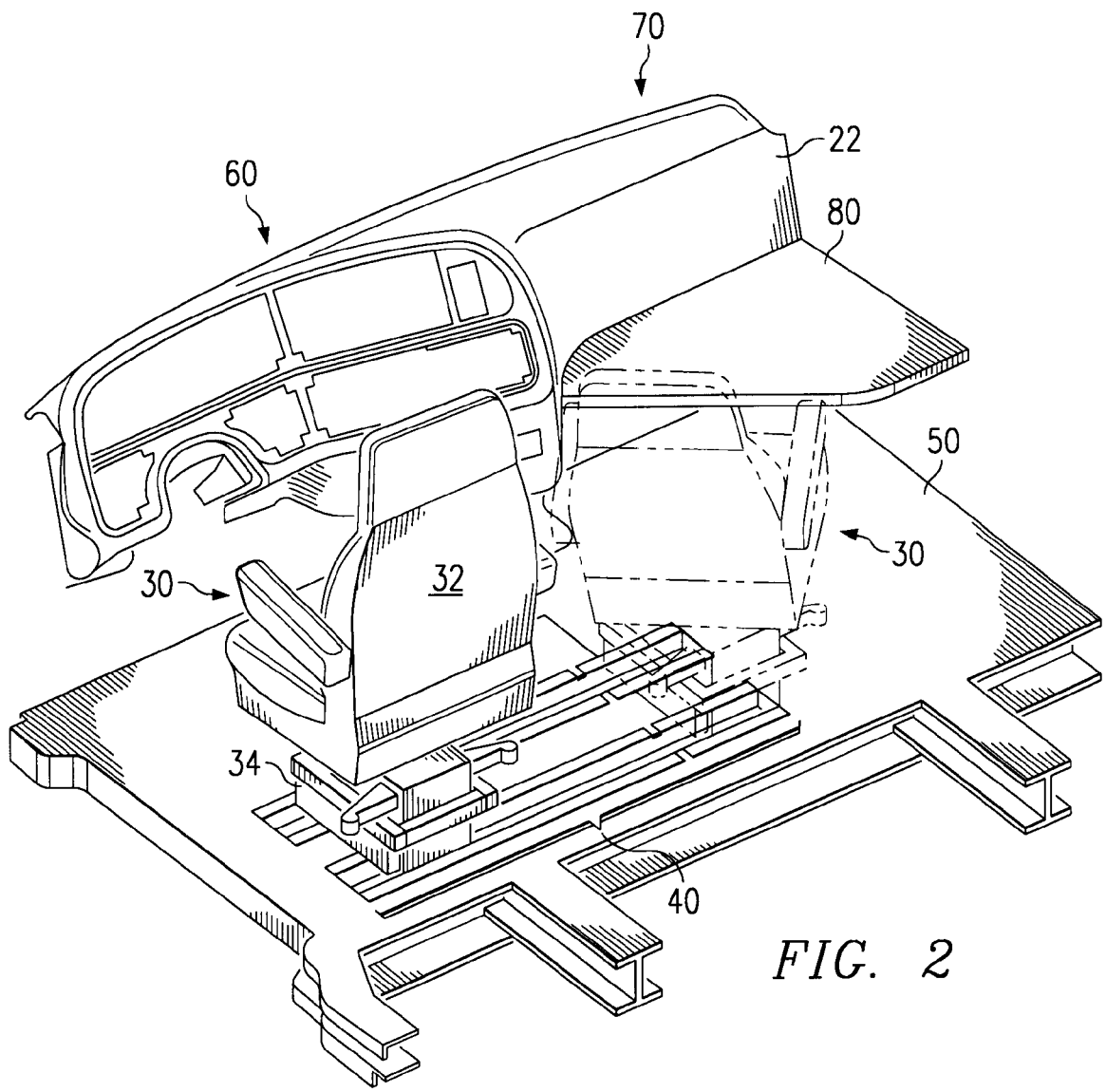
FIG. 2 shows a perspective view of the tractor-truck cab of FIG. 1 in which portions of the tractor-truck cab have been omitted for clarity.

FIG. 2 is a perspective view of the tractor-truck cab of FIG. 1 in which portions of the tractor-truck cab have been omitted for clarity in order to facilitate an explanation of the seat 30 and the seat-supporting track 40. As shown in FIG. 2, the seat 30 can be positioned in the driving position 60 or the workstation position 70, as shown in phantom. The seat 30 of the preferred embodiment is similar to a style of vehicle seat commonly referred to as a captain's chair. However, there are many known types and styles of seats, particularly vehicle seats, that can be suitably adapted for use with the present invention.

The seat 30 includes an upper portion 32 and a base portion 34. The upper portion 32 is rotatably secured to the base portion 34. A swivel bearing (not shown) is secured between the upper portion 32 and the base portion 34 for rotating the upper portion 32 in a plane substantially parallel to the floor 50 of the cab 20.

When the seat 30 is in the driving position 60, a driver in the seat 30 can conveniently operate the tractor-truck 10. Alternatively, when the seat 30 is in the workstation position 70, a person in the seat 30 can conveniently use the work-surface platform 80 as a desk or workstation. Also, when the seat 30 is in the workstation position 70, an increased amount of space is provided near the driver side door (not shown), making access to the rear portion of the cab 20 from the driver side door more convenient. For instance, in a situation where the cab 20 includes sleeping quarters in its rear portion, the additional space created by moving the seat 30 to the workstation position 70 allows for direct access to the sleeping quarters from the driver side door, thus facilitating loading and unloading of items in and out of the cab 20.

As mentioned above, the seat 30 can be moved between the driving position 60 and the workstation position 70 along the seat-supporting track 40. FIG. 3 shows an example of a suitable seat-supporting track 40. FIG. 4 shows a cross-sectional view of a portion of the seat-supporting track 40 at section 4—4. The track 40 includes two track frames 42, each of which extends substantially parallel to the other, preferably fixed to a relatively rigid portion of the floor 50 or a supporting member thereof. The track 40 also includes two track bars 46, each of which is fixed to a respective track frame 42. The track 40 further includes a plurality of traveler car assemblies 44. Two traveler car assemblies 44 are slidably fixed to each of the track bars 46. Each traveler car assembly 44 includes a seat-mounting receptacle 45, into which the base portion 34 of the seat 30 can be fixed. Each traveler car assembly 44 also includes a plurality of rollers 48, as shown in FIG. 4. Each track bar 46 has curved surfaces provided along opposing sides thereof. The rollers 48 of each traveler car assembly 44 are provided on opposing sides of the track bar 46 adjacent and in contact with the curved surfaces thereof. This allows each traveler car assembly 44 to move along its respective track bar 46, while securely maintaining each traveler car assembly 44 on its respective track bar 46.

Figure 7:
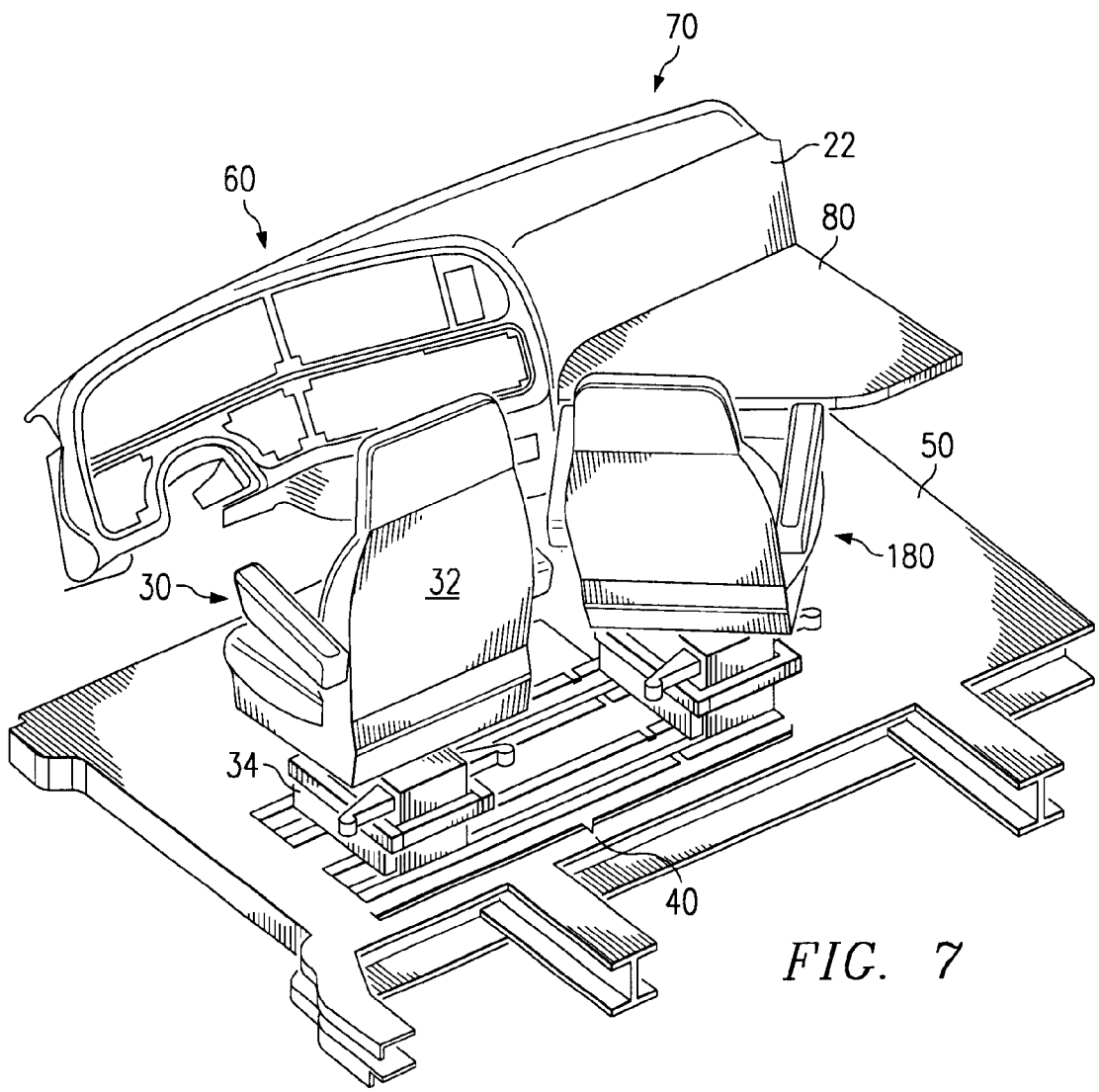
FIG. 7 shows a perspective view of a tractor-truck cab interior in accordance with an embodiment of the present invention.

The seat-supporting track 40 also includes two seat-mounting brackets 170, each of which is fixed to a respective track frame 42. The seat-mounting brackets 170 can be used for removably mounting a second seat 180, as shown in FIG. 7. Note, however, that the seat-mounting brackets 170 are shaped and positioned so as not to interfere with the ability of traveler car assemblies 44 to move seat 30 to the workstation position 70 when second seat 180 is not mounted to seat-mounting brackets 170.

The seat-supporting track 40 should be constructed in a manner that adequately supports the seat 30 and prevents unintentional detachment of the seat 30 from the floor 50 of the cab 20. Therefore, the track frames 42, traveler car assemblies 44, track bars 46, and rollers 48 are all preferably composed of a substantially rigid material, such as a metal or the like.

In addition, there are several modifications that can be made to the track 40 without deviating from the scope of the present invention. For instance, while the seat-supporting track 40 has been shown with two substantially parallel subassemblies, each comprising a track frame 42, a track bar 46, traveler car assemblies 44 and so forth, any number of such substantially parallel subassemblies can be used. As another example, while two traveler car assemblies 44 have been shown slidably fixed to each track bar 46, any number of traveler car assemblies 44 can be used so long as sufficient support is provided to prevent the seat 30 from unintentionally separating from the track bars 46. Further, the present invention is not necessarily limited to the track described above and shown in the several figures. Rather, there are many known styles and types of track/traveler-car combinations that can be adapted for use with the present invention such as I-beam tracks or X-track with traveler cars having ball-bearing wheels, a recirculating ball-bearing track, or a T-track with traveler cars having slide rods.

In order to ensure safe driving conditions, an interlock system is provided to keep the tractor-truck 10 from moving if the seat 30 is not in the driving position 60. The embodiment shown in FIG. 3 includes an illustration of a preferred interlock system. The preferred interlock system can also be seen in FIG. 5, which is similar to FIG. 3 except that the track frames 42 have been omitted in FIG. 5 for clarity, and in FIGS. 8a and 8b, each of which provide a plan view of a portion of the interlock system showing alternate positions of a solenoid plunger 150'.

Figure 8A:
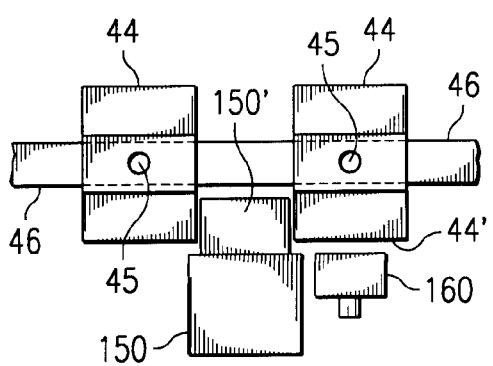
FIGS. 8a and 8b show plan views of an example of an interlock system for an embodiment of the present invention, illustrating alternate positions of a solenoid plunger included in the interlock system.

The preferred interlock system includes two solenoids 150, each fixed to a respective track frame 42. When the solenoid 150 is activated, as shown in FIG. 8a, the solenoid plunger 150' extends to fill at least a portion of a space between adjacent traveler car assemblies 44 on the track bar 46. The solenoid 150 and, thus, the solenoid plunger 150', are fixed in place relative to the track bar 46. When fully assembled, the base portion 34 of the seat 30 will be fixed to each of the adjacent traveler car assemblies 44 on the track bar 46. Once the base portion 34 of the seat 30 is fixed to each of the adjacent traveler car assemblies 44 on the track bar 46, the adjacent traveler car assemblies 44 must maintain a constant distance from one another while moving along the track bar 46. So, with the solenoid 150 activated such that the plunger 150' is extended and fills at least a portion of the space between the adjacent traveler car assemblies 44 (fixed relative to one another) on the track bar 46, the solenoid plunger 150' obstructs each of the adjacent traveler car assemblies 44 in opposite directions along the track bar 46, preventing the adjacent traveler car assemblies 44 from moving a substantial amount along the track bar 46. Accordingly, since the traveler car assemblies 44 support the seat 30, the seat 30 will also be prevented from moving a substantial amount along the track bar 46 when the solenoid 150 is activated. Thus, with the solenoid 150 activated, the seat 30 can be locked in the driving position 60.

Figure 8B:
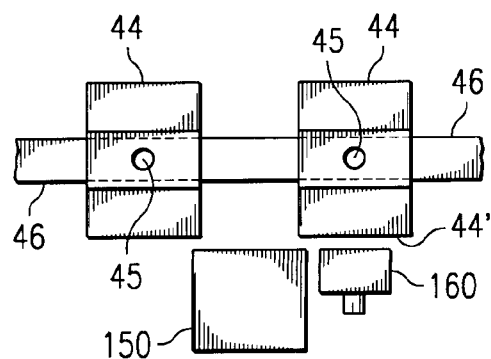

When the solenoid 150 is deactivated, as shown in FIG. 8b, the solenoid plunger 150' retracts from the space between the adjacent traveler car assemblies 44 on the track bar 46. Once the solenoid plunger 150' has retracted, the solenoid plunger 150' no longer obstructs each of the adjacent traveler car assemblies 44 along the track bar 46, and therefore no longer prevents the seat 30 from moving along the track bar 46. Thus, with the solenoid 150 deactivated, the seat 30 can be unlocked from the driving position 60.

The preferred interlock system also includes two sensors 160, each fixed to a respective track frame 42. The sensors 160 can be any of several different types of sensing or switching devices known in the art capable of being used to detect the presence of the seat 30. In this embodiment, the sensors 160 are optical transmitting/receiving devices, which are well known in the art. One traveler car assembly 44 on each track bar 46 has at least a portion thereof, indicated in FIGS. 8a and 8b as surface 44', with a high reflectivity relative to the reflectivity of the second traveler car assembly 44, the track bar 46, and any other items in the general vicinity. When the sensor 160 is transmitting light, and the highly reflective portion 44' of the traveler car assembly 44 is properly aligned with the sensor 160, an amount of light received by the sensor 160 increases. If the amount of light received by the sensor 160 exceeds a certain threshold amount, such as the case when the highly reflective portion 44' is properly aligned with the sensor 160, the sensor 160 issues an output that can be used to indicate that the seat 30 is in the driving position 60. If the amount of light received by the sensor 160 does not exceed a certain threshold amount, such as the case when the highly reflective portion 44' is not properly aligned with the sensor 160, the sensor issues a second output that can be used to indicate that the seat 30 is not in the driving position 60. Thus, the sensor 160 can be used to detect whether the seat 30 is in the driving position 60.

While the present embodiment has been described using an optical transmitting/receiving device in combination with a highly reflective portion of a traveler car assembly 44, there are many known methods of detecting or sensing the presence and/or position of an object that can be adapted for use with the present invention. For instance, the sensor 160 can be some type of switch, such as a pressure-activated switch that is physically activated when the seat 30 is in the driving position 60 and physically deactivated when the seat 30 is not in the driving position 60. Other methods can employ any one or combination of well-known types of sensors, switches, or the like, such as displacement sensors, electrical and electromagnetic sensors, encoders, resolvers, linear position sensors, proximity sensors/switches, vision/image sensors, and so on.

Figure 9:
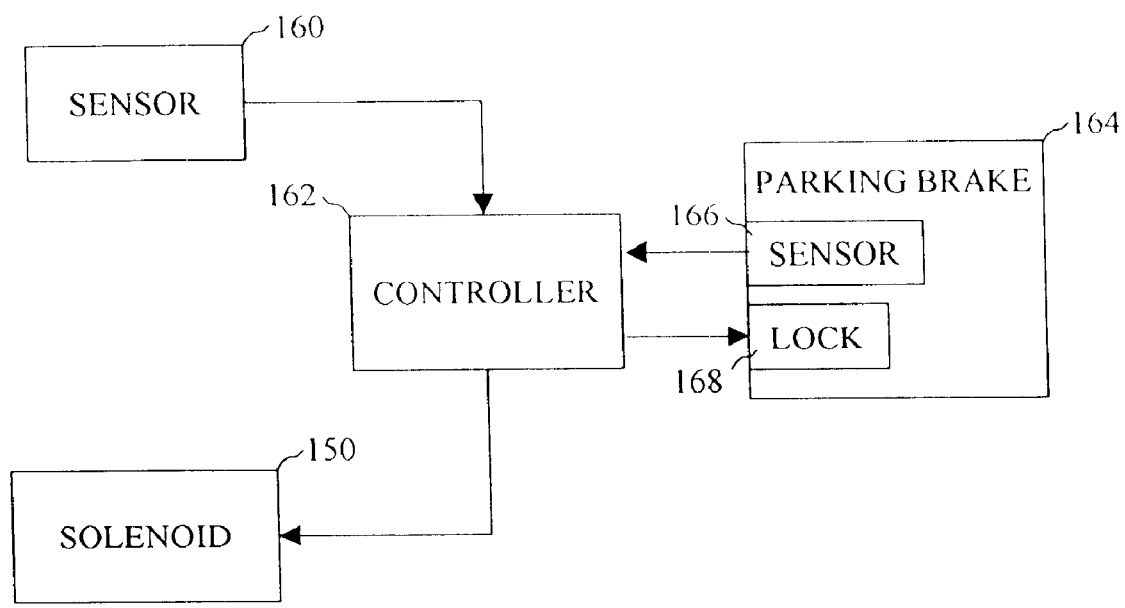
FIG. 9 shows a schematic block diagram showing a signal flow for an example of an interlock system of an embodiment of the present invention.

Referring now to FIG. 9, the operation of the preferred interlock system will be explained. In the preferred interlock system, the solenoid 150 and the sensor 160 are each in communication with a controller 162. Also, a vehicle movement-prohibiting device is in communication with the controller. In the present embodiment, a parking brake 164 is provided as an example of said vehicle movement-prohibiting device. The parking brake 164 includes a parking-brake sensor 166 for detecting whether the parking brake 164 is engaged or disengaged, and a parking-brake lock 168 for selectively locking the parking brake 164 in the engaged position. As shown in FIG. 9, the parking-brake sensor 166 and the parking-brake lock 168 are each in communication with the controller 162.

In the present embodiment, there are two cases where the controller 162 operates the parking-brake lock 168. In one case, as described above, where the sensor 160 issues an output indicating that the seat 30 is not in the driving position 60, this information is provided to the controller 162, which in turn acts to prevent the parking brake 164 of the tractor-truck 10 from being releasable by signaling the parking-brake lock 168 to engage so that the tractor-truck 10 cannot be moved. In another case, as described above, where the sensor 160 issues an output indicating that the seat 30 is in the driving position 60, this information is provided to the controller 162, which in turn acts to allow the parking brake 164 of the tractor-truck 10 to be releasable by signaling the parking-brake lock 168 to disengage, thereby allowing the tractor-truck 10 to be normally operated.

In the present embodiment, there are also two cases where the controller 162 operates the solenoid 150, thereby locking or unlocking the seat 30 at the driving position 60. In one case where the controller 162 detects that the seat 30 is in the driving position 60 and the parking-brake sensor 166 signals the controller 162 that the parking brake 164 is being released, the controller 162 acts to activate the solenoid 150, thus extending the solenoid plunger 150' as shown in FIG. 8a, thereby locking the seat 30 in the driving position 60 as long as the parking brake 164 is released (such as while an operator is driving the tractor-truck 10). In another case, such as once the tractor-truck 10 is parked, where the parking-brake sensor 166 signals the controller 162 that the parking brake 164 of the tractor-truck 10 is set, the controller 162 deactivates the solenoid 150, thus retracting the solenoid plunger 150' as shown in FIG. 8b and thereby unlocking the seat 30 from the driving position 60.

There are many known methods for sensing whether the parking brake 164 is engaged or disengaged that would equate to the parking-brake sensor 166, such as known methods used to activate a console light for informing an operator when the parking brake is set. Optionally, the truck cab 20 can be equipped with a seat lock activator (not shown) such as a console button, switch, lever, or the like that the operator can activate and deactivate for locking and unlocking, respectively, the seat 30 in the driving position 60. In this case, the parking brake sensor 166 could be omitted, and the controller 162 would instead lock or unlock the parking brake lock 168 depending on whether the seat 30 is in the driving position 60 and the seat lock activator is activated or deactivated.

Also, there are many suitable ways to provide a locking mechanism equating to the parking-brake lock 168, such as a solenoid positioned in such a way so as to block a path used when moving a parking-brake handle (not shown) to disengage the parking brake 164.

While, in the present embodiment, a parking brake 164 is provided as an example of the vehicle movement-prohibiting device, the present invention is not necessarily limited to such a configuration. For instance, instead of preventing the parking brake 164 from being releasable, the controller 162 can be adapted to disable the ignition switch of the tractor-truck 10 in order to keep the tractor-truck 10 from starting when the seat 30 is not in the driving position 60, lock the seat 30 in the driving position 60 when the ignition switch is sensed to have been moved, and so on, thereby using the ignition switch as the vehicle movement-prohibiting device. As another example, if the vehicle is equipped with an automatic transmission, the controller 162 can be adapted to prevent the automatic-transmission shifter from shifting out of "Park" in order to keep the tractor-truck 10 from moving if the seat 30 is not in the driving position 60, lock the seat 30 in the driving position 60 when the shifter is sensed to have been moved, and so on, thereby using the transmission shifter as the vehicle movement-prohibiting device.

FIG. 5 shows a perspective view of a seat-mounting track 40', which is an alternative to the seat-mounting track 40 of FIG. 3. FIG. 6 further shows a cross-sectional view of a portion of the seat-supporting track 40' along section 6—6. As shown in FIG. 5, the seat-mounting track 40' comprises two track bars 46, each of which is preferably fixed to a relatively rigid portion of an upper surface of the floor 50 and extends substantially parallel to the other. The seat-supporting track 40' also comprises a plurality of traveler car assemblies 44. Two traveler car assemblies 44 are slidably fixed to each of the track bars 46. As can be seen in FIG. 6, the traveler car assemblies 44 and the way they are slidably fixed to each of the track bars 46 is substantially the same as described above for the seat-supporting track 40 shown in FIGS. 3 and 4. In addition, an interlock system comprising a solenoid 150 and a sensor 160 are also provided, each fixed to the floor 50 of the cab 20. The operation of the interlock system is substantially the same as the description above.

An advantage to the seat-mounting track 40' as compared to the seat-mounting track 40 is that the seat-mounting track 40' is fixed to an upper surface of the floor 50 of the cab 20, thus eliminating the need for the track frames 42.

FIG. 7 is a perspective view of the cab 20, wherein a second seat 180 is removably attached to the seat-mounting brackets 170. The base of the second seat 180 is provided with a mechanism (not shown) suitable for engaging the seat-mounting brackets 170. There are several such mechanisms known in the art that can be adapted for use with the present invention. For example, one such mechanism is disclosed in U.S. Pat. No. 5,765,894 to Okazaki et al.

Although the present invention has been fully described by way of preferred embodiments, one skilled in the art will appreciate that other embodiments and methods are possible without departing from the spirit and scope of the present invention.

What is claimed is:

1. A tractor-truck cab comprising:
  a seat-supporting track extending between a driving position located on a driver side of the cab and a workstation position located on a passenger side of the cab;
  a seat mounted on the seat-supporting track for movement therealong between the driving position and the workstation position;
  a work-surface platform provided on the passenger side of the cab; and
  an interlocking system for selectively locking the seat in the driving position,
  wherein the interlocking system comprises:
    a vehicle movement-prohibiting device;
    a switching device;
    a blocking device for selectively obstructing a path along the seat-supporting track; and
    a controller in communication with the vehicle movement-prohibiting device, the switching device, and the blocking device, for controlling the blocking device based at least in part on a signal from the switching device.

2. A tractor-truck cab in accordance with claim 1, wherein the switching device comprises a sensor for sensing a state of the vehicle movement-prohibiting device.

3. A tractor-truck cab in accordance with claim 2, wherein the vehicle movement-prohibiting device comprises a parking brake for preventing vehicle movement in a set state and for allowing vehicle movement in a released state.

4. A tractor-truck cab in accordance with claim 3, wherein the blocking device comprises a solenoid.

5. A tractor-truck cab in accordance with claim 4, wherein the controller controls the blocking device to obstruct the path along the seat-supporting track when the switching device signals the controller that the parking brake is in the released state, and the controller controls the blocking device to unobstruct the path along the seat-supporting track when the switching device signals the controller that the parking brake is in the set state.

6. A tractor-truck cab in accordance with claim 1, further comprising:
  a sensing device for detecting a position of the seat; and
  a locking mechanism for selectively maintaining the vehicle movement-prohibiting device in a predetermined state,
  wherein the controller controls the locking mechanism based at least in part on a position signal received from the sensing device.

7. A tractor-truck cab in accordance with claim 6, wherein the sensing device comprises an optical sensor.

8. A tractor-truck cab in accordance with claim 7, wherein the locking mechanism comprises a solenoid.

9. A tractor-truck cab in accordance with claim 8, wherein the controller controls the locking mechanism to maintain the vehicle movement-prohibiting device in the predetermined state when the position signal received from the sensing device indicates that the seat is not in the driving position, and the controller controls the locking mechanism to allow the vehicle movement-prohibiting device to move from the predetermined state when the position signal received from the sensing device indicates that the seat is in the driving position.

10. A tractor-truck cab comprising:
a seat-supporting track extending between a driving position located on a driver side of the cab and a workstation position located on a passenger side of the cab;
a seat mounted on the seat-supporting track for movement therealong between the driving position and the workstation position;
a work-surface platform provided on the passenger side of the cab;
a seat-position sensor for detecting a seat position of the seat;
a solenoid for selectively locking the seat in a predetermined position;
a parking-brake-position sensor for detecting a parking-brake position of a parking brake;
a parking-brake lock for selectively locking the parking brake in an engaged position; and
a controller for controlling the solenoid based at least in part on the parking-brake position detected by the parking-brake-position sensor, and for controlling the parking-brake lock based at least in part on the seat position detected by the seat-position sensor.

11. A tractor-truck cab in accordance with claim 1, further comprising a passenger seat removably mounted on the seat-supporting track at the workstation position.

12. A tractor-truck cab in accordance with claim 1, wherein the seat comprises a base portion and a seat portion rotatably mounted to the base portion.

13. A tractor-truck cab in accordance with claim 1, wherein the work-surface platform has a first edge which extends along a portion of a forward wall of the cab, and has a second edge which extends along a portion of a side wall of the cab.

14. A tractor-truck cab in accordance with claim 13, wherein the work-surface platform is positioned below a window of the cab.

15. A tractor-truck cab in accordance with claim 14, wherein the work-surface platform includes a substantially transparent display portion.

16. A tractor-truck cab comprising:
a seat-supporting track extending between a driving position located on a driver side of the cab and a workstation position located on a passenger side of the cab;
a seat mounted on the seat-supporting track for movement therealong between the driving position and the workstation position;
a work-surface platform provided on the passenger side of the cab, wherein the work-surface platform has a first edge which extends alone a portion of a forward wall of the cab, and has a second edge which extends along a portion of a side wall of the cab, wherein the work-surface platform is positioned below a window of the cab, and wherein the work-surface platform includes a substantially transparent display portion;
a computer;
a keyboard fixed to an upper surface of the work-surface platform; and
a computer monitor fixed to a lower surface of the work-surface platform and having a display screen, wherein the computer monitor is positioned such that the display screen can be viewed through the display portion of the work-surface platform.

17. A tractor-truck cab in accordance with claim 16, further comprising a document scanning device fixed to the upper surface of the work-surface platform and capable of interfacing with the computer.

18. A tractor-truck cab in accordance with claim 16, further comprising a document faxing device fixed to the upper surface of the work-surface platform.

19. A tractor-truck cab in accordance with claim 16, further comprising a document printing device fixed to the upper surface of the work-surface platform and capable of interfacing with the computer.

20. A tractor-truck cab in accordance with claim 1, further comprising a filing cabinet mounted in the cab below the work-surface platform.

21. A tractor-truck cab in accordance with claim 1, further comprising a curtain track mounted above at least a portion of a window of the cab, and a curtain slidably fixed to the curtain track for extending therealong.

22. A tractor-truck comprising:
a cab having a driver side and having a passenger side opposite said driver side;
a seat-supporting track, disposed within the interior of the cab, extending between the driver side of the cab and the passenger side of the cab, wherein the seat-supporting track includes a driving position from which the tractor truck can be driven by an operator seated in said seat;
a seat disposed within the interior of the cab, mounted on the seat-supporting track for movement therealong between the driver side and the passenger side;
a work-surface platform provided on the passenger side of the cab; and
an interlocking system for locking the seat in the driving position,
wherein the interlocking system comprises:
a vehicle movement-prohibiting device;
a switching device;
a blocking device for selectively obstructing a path along) the seat-supporting track; and
a controller, in communication with the vehicle movement-prohibiting device, the switching device, and the blocking device, for controlling the blocking device based at least in part on a signal from the switching device.

23. A tractor-truck in accordance with claim 22,
wherein said driver side includes a driver-side door, and wherein said passenger side is free of a passenger-side door.

24. A tractor-truck in accordance with claim 22, further comprising a seat-mounting bracket for removably installing a second seat on the passenger side of the cab.

25. A tractor-truck in accordance with claim 24, further comprising a filing cabinet mounted in the cab below the work-surface platform.

26. A tractor-truck in accordance with claim 25, further comprising a curtain track mounted above at least a portion of a window of the cab, and a curtain slidably fixed to the curtain track for extending therealong.

27. A tractor-truck cab comprising:
a seat-supporting track extending along an interior floor of the tractor-truck cab;
a seat slidably mounted to the seat-supporting track;
a work-surface platform having an upper surface that is substantially parallel with an upper surface of said interior floor; and a display device provided between the floor of the cab and the work-surface platform, wherein the seat-supporting track includes a driving position and a work-station position, wherein the seat-supporting track allows for the seat to be selectively positioned at either one of the driving position and the work-station position, wherein the work-surface platform is positioned such that the upper surface of the work-surface platform is suitable for use as a desk by a user seated in the seat if the seat is positioned at the workstation position, wherein the work-surface platform includes a substantially transparent display portion, wherein an image on the display device is viewable by a user seated in the seat if the seat is positioned at the workstation position, and wherein the display device is mounted to a lower surface of the work-surface platform, wherein the display device includes a display for displaying the image, and wherein the display is substantially aligned with the transparent display portion of the work-surface platform.

28. A tractor-truck cab in accordance with claim 27, wherein a distance from the upper surface of the work-surface platform to the floor of the cab is in a range of 20 inches to 40 inches.

29. A tractor-truck cab in accordance with claim 28, wherein said distance is in a range of 25 inches to 31 inches.

30. A tractor-truck cab in accordance with claim 27, wherein the upper surface of the work-surface platform is positioned below a window of the cab.

31. A tractor-truck cab in accordance with claim 27, further comprising:
   a computer in communication with the display device;
   a computer peripheral in communication with the computer, said computer peripheral having the capabilities of at least one device selected from the group consisting of a printer, a plotter, a scanner, an imager, a fax machine, and a photocopier.

32. A tractor-truck cab in accordance with claim 27, further comprising a filing cabinet mounted in the cab below the work-surface platform.

33. A tractor-truck cab in accordance with claim 32, further comprising a curtain track mounted above at least a portion of a window of the cab, and a curtain slidably fixed to the curtain track for extending therealong.

34. A tractor-truck cab in accordance with claim 33, wherein said seat is a first seat, and the tractor-truck cab further comprises a seat-mounting bracket for removably installing a second seat on the passenger side of the cab.

35. A tractor-truck cab in accordance with claim 34, further comprising an interlocking system for locking the first seat in the driving position.

36. A tractor-truck cab in accordance with claim 27, further comprising an interlocking system for locking the seat in the driving position.

\* \* \* \* \*

UNITED STATES PATENT AND TRADEMARK OFFICE
CERTIFICATE OF CORRECTION

PATENT NO. : 6,692,051 B1
DATED : February 17, 2004
INVENTOR(S) : Charles L. Cook et al.

It is certified that error appears in the above-identified patent and that said Letters Patent is hereby corrected as shown below:

Column 13,
Line 56, delete "alone", and insert -- along --.

Column 14,
Line 30, after "seat", insert -- , --.
Line 41, after "along", delete ")".

Signed and Sealed this

Twentieth Day of July, 2004

JON W. DUDAS
*Acting Director of the United States Patent and Trademark Office*